US012768212B2

(12) United States Patent
Choi et al.

(10) Patent No.: US 12,768,212 B2
(45) Date of Patent: Oct. 20, 2026

(54) VEHICLE DOOR PINCH DETECTION SYSTEM AND METHOD

(71) Applicants: Hyundai Motor Company, Seoul (KR); Kia Corporation, Seoul (KR); WINNERCOM CO., LTD., Gimhae-si (KR)

(72) Inventors: Hak-Hui Choi, Hwaseong-Si (KR); Hyung-Sik Choi, Hwaseong-Si (KR); Jun-Young Shin, Suwon-si (KR); Hu-Min Jung, Hanam-si (KR); Eui-Suk Jeong, Bucheon-Si (KR)

(73) Assignees: Hyundai Motor Company, Seoul (KR); Kia Corporation, Seoul (KR); WINNERCOM CO., LTD., Gimhae-si (KR)

( * ) Notice: Subject to any disclaimer, the term of this patent is extended or adjusted under 35 U.S.C. 154(b) by 0 days.

(21) Appl. No.: 18/958,582

(22) Filed: Nov. 25, 2024

(65) Prior Publication Data

US 2025/0270866 A1 Aug. 28, 2025

(30) Foreign Application Priority Data

Feb. 28, 2024 (KR) ........................ 10-2024-0029171

(51) Int. Cl.
*E05F 15/42* (2015.01)
*E05F 15/71* (2015.01)
*B60J 10/86* (2016.01)

(52) U.S. Cl.
CPC .............. *E05F 15/42* (2015.01); *E05F 15/71* (2015.01); *B60J 10/86* (2016.02); *E05Y 2900/531* (2013.01)

(58) Field of Classification Search
CPC . E05F 15/42; E05F 15/71; E05F 15/46; E05F 15/73; B60J 10/86
See application file for complete search history.

(56) References Cited

U.S. PATENT DOCUMENTS 5,054,686 A * 10/1991 Chuang .................. B60R 25/00 236/1 R
2002/0043948 A1* 4/2002 Ogasawara ............ E05F 15/46 318/445

(Continued)

FOREIGN PATENT DOCUMENTS

KR 10-2018-0067987 A 6/2018
WO WO 2013075242 * 5/2013

*Primary Examiner* — Gregory J Strimbu
(74) *Attorney, Agent, or Firm* — MORGAN, LEWIS & BOCKIUS LLP

(57) ABSTRACT

A vehicle door pinch detection method includes a door closure request step in which a controller determines whether there is a request to close a vehicle door, a rainy weather determination step in which the controller determines whether it is rainy weather or non-rainy weather by a rain detection sensor provided at a weather strip, a door closure initiation step in which the controller loads a pinch threshold and starts actuating a door motor for closing the vehicle door; and a pinch determination step in which the controller determines whether there occurs a pinch by a pinch sensor provided on the weather strip, wherein the controller loads different pinch thresholds based on the rainy weather or the non-rainy weather, and if the pinch is detected in the pinch determination step, the controller opens the door. An apparatus for performing the method is also disclosed.

18 Claims, 10 Drawing Sheets

(56) References Cited

U.S. PATENT DOCUMENTS

| | | | | |
|---|---|---|---|---|
| 2017/0016266 | A1* | 1/2017 | Van Wiemeersch | B60J 1/00 |
| 2022/0243521 | A1* | 8/2022 | Herman | B60R 1/12 |
| 2022/0316257 | A1* | 10/2022 | Kang | E05F 15/77 |
| 2025/0208078 | A1* | 6/2025 | Narasimalu | G01N 25/66 |

* cited by examiner

VEHICLE DOOR PINCH DETECTION SYSTEM AND METHOD

CROSS-REFERENCE TO RELATED APPLICATION

The present application claims priority to Korean Patent Application No. 10-2024-0029171, filed on Feb. 28, 2024, the entire contents of which is incorporated herein for all purposes by this reference.

BACKGROUND OF THE PRESENT DISCLOSURE

Field of the Present Disclosure

The present disclosure relates to a vehicle door pinch detection system and method to detect pinching of an occupant's body while closing of the door and more particularly, to a vehicle door pinch detection system and method in which detection sensitivity is adjusted in case of rain to eliminate poor detection and improve detection performance.

Description of Related Art

Anti-pinch sensors are provided on a vehicle door to detect pinching of an occupant's body or belongings between a vehicle door being closed and a vehicle body, or between the vehicle doors when the occupant gets in or out of the vehicle.

The anti-pinch sensors are typically provided inside a weather strip provided around a periphery of the vehicle door, so that in the event of a pinch, the weather strip is first deformed and then the anti-pinch sensors detect a deformation of the weather strip and therefore an occurrence of the pinch.

Purpose built vehicles (PBVs) that operate based on autonomous driving are expected to be utilized as passenger transportation vehicles. As the PBVs are operated without a driver, there is a need to increase a reliability of the in-vehicle safety systems.

For example, a pinch occurring upon the door closing needs to be detected very precisely in the absence of the driver to avoid unnecessary malfunctions and safety accidents.

In a rainy weather, the anti-pinch sensors may malfunction due to direct contact with moisture or high humidity. In other words, in spite of no pinch situation, frequent false detection of the pinch due to malfunctions of the anti-pinch sensors results in repeated door opening and closing, which delays a departure of the vehicle and prevents the vehicle from moving quickly.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle door pinch detection system and method which are configured for detecting a pinch of a vehicle door while adopting different pinch thresholds for a rainy or non-rainy weather, preventing malfunction and improving detection performance.

Another objective of the present disclosure is to provide a vehicle door pinch detection system and method in which, when a pinch or a touch occurs on a vehicle door, an occupant is informed of the pinch or touch through an alarm and the vehicle door is reopened to prevent injury to the occupant, improving detection performance.

An aspect of the present disclosure may provide a vehicle door pinch detection system with improved detection performance, the system including: an internal pinch sensor configured for detecting a pinch at a periphery of a vehicle door ("a door") provided on one side of a vehicle during a closing operation; a rain detection sensor provided separately from the internal pinch sensor and configured for detecting a rainy weather; and a controller operatively connected to the internal pinch sensor and rain detection sensor and configured to determine whether a current weather is rainy weather or non-rainy weather based on an output of the rain detection sensor, to load different pinch thresholds in response to a rainy weather or a non-rainy weather, and determine an occurrence of the pinch if the output of the internal pinch sensor is equal to or greater than the pinch thresholds.

The controller may set a pinch threshold for the non-rainy weather to be higher than a pinch threshold for the rainy weather.

The internal pinch sensor and the rain detection sensor may transmit respective output values depending on a change in impedance, and the controller may compare the output values of the internal pinch sensor and the rain detection sensor with preset values to determine a body's pinching or approaching or rainy weather.

The internal pinch sensor and the rain detection sensor may be mounted on an internal weather strip of the vehicle.

The system may further include an external pinch sensor operatively connected to the controller and provided on an external weather strip to detect a pinch depending on a change in resistance value upon an occupant's pinch.

The controller may include: a rain detection controller configured to receive an output value from the rain detection sensor and control the rain detection sensor; an internal pinch controller configured to receive an output value from the internal pinch sensor and control the internal pinch sensor; and an external pinch controller configured to receive an output value from the external pinch sensor and control the external pinch sensor.

The controller may be connected to a door controller to control an opening or a closing of the vehicle door.

The door controller may be connected to a door button that outputs an operation signal when opening of the door is required, and to an alarm means that alarms when opening or closing of the door is completed.

The controller may be configured to, upon detection of the body's pinching or approaching around the periphery of the door during closing of the door, increase a count, and if the increased count is below a predetermined count threshold, request the door controller to open the door for a predetermined time period and then close the door again.

Another aspect of the present disclosure provides a method of detecting a pinch in a vehicle door with improved detection performance, the method including steps performed by a controller: determining whether there is a vehicle door closing request; determining whether it is rainy weather or non-rainy weather by a rain detection sensor provided on a weather strip; initiating closure of the door, by the controller, by loading a pinch threshold and actuating a door motor to close the door; and determining, whether there occurs a pinch by a pinch sensor provided on the weather strip, wherein the controller loads different pinch thresholds depending on whether it is rainy weather or non-rainy weather, and if the pinch is detected in the pinch determination step, the controller is configured to open the door.

If it is determined to be rainy weather in the rainy weather determination step, a pinch threshold for the rainy weather may be loaded.

If it is determined to be non-rainy weather in the rainy weather determination step, a pinch threshold for the non-rainy weather may be loaded.

The pinch threshold for the rainy weather may be set higher than the pinch threshold for the non-rainy weather.

In the door closure initiation step, the controller may be configured to reset the count, wherein the method further includes steps performed by the controller: if the pinch is detected in the pinch determination step, increasing the count; determining whether the increased count has reached a predetermined count threshold at which the controller stops the control operation; and if the count is below the count threshold in the increased count determination step, temporarily opening the door and then closing the door again after a predetermined time period.

The method may further include steps performed by the controller: if the count is determined to have reached the count threshold in the increased count determination step, opening the door for interruption of the control operation; determining whether the opening of the door has been completed; and if the opening of the door has been completed, stopping an actuation of the door motor and alarming that the actuation of the door motor has been stopped.

The rain detection sensor may be mounted on an internal weather strip of the vehicle.

The pinch sensor may include an internal pinch sensor provided on the internal weather strip to detect the occupant's pinching or approaching by a change in impedance, and an external pinch sensor provided on an external weather strip to detect the occupant's pinching by a change in resistance value upon the occupant's pinching.

The method may further include the step performed by the controller: if it is determined that no pinching is detected in the pinch determination step, determining whether a closing of the door has been completed, and if it is determined that the closing of the door has been completed, the controller may be configured to stop the actuation of the door motor and alarm the stopping of the actuation of the door motor.

According to the vehicle door pinch detection system and method including the above-mentioned configurations with improved detection performance, a pinch may be detected on an external side of the vehicle by an external sensor in a resistive-detection type and on an internal side of the vehicle by an internal sensor in an impedance-detection type.

the rainy or non-rainy weather may be detected by an impedance-detective manner, and according to a weather condition, a body detection level of the sensor may be varied to eliminate detection defects.

Furthermore, if the body's pinch or touch is detected, the door is opened and an alarm is triggered so that the occupants may recognize the pinch or touch and then avoid injuries.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
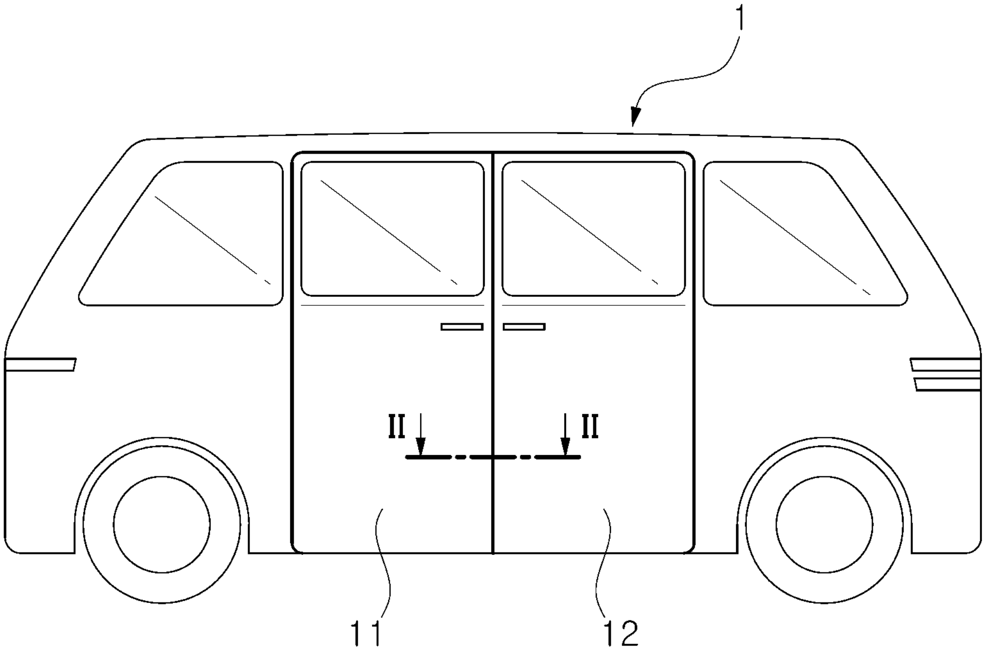
FIG. 1 is a side diagram illustrating a vehicle including a vehicle door pinch detection system with improved detection performance according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a vehicle door pinch detection system and method with improved detection performance according to an exemplary embodiment of the present disclosure will be described in detail with reference to the accompanying drawings.

FIG. 1 illustrates an example of a vehicle 1 including a vehicle door ("a door") pinch detection system with improved detection performance according to an exemplary embodiment of the present disclosure. The present disclosure may be applied to a vehicle 1 in which a pair of doors 11 and 12 are slidably provided. The present disclosure may be applied to the vehicle 1, such as a purpose-built vehicle (PBV) between a front door 11 and a rear door 12.

In the vehicle 1 illustrated in FIG. 1, the front door 11 may slidably open toward a front of the vehicle 1 (in a leftward direction in FIG. 1) and the rear door 12 may slidably open toward a rear of the vehicle 1 (in a rightward direction in FIG. 1), wherein the vehicle door pinch detection system of the present disclosure is provided to detect a pinch between the front door 11 and the rear door 12. Of course, the vehicle door pinch detection system may also be applied to a vehicle in which the doors are opened or closed in a swinging manner to detect a pinch between the vehicle door and the vehicle body.

Figure 2:
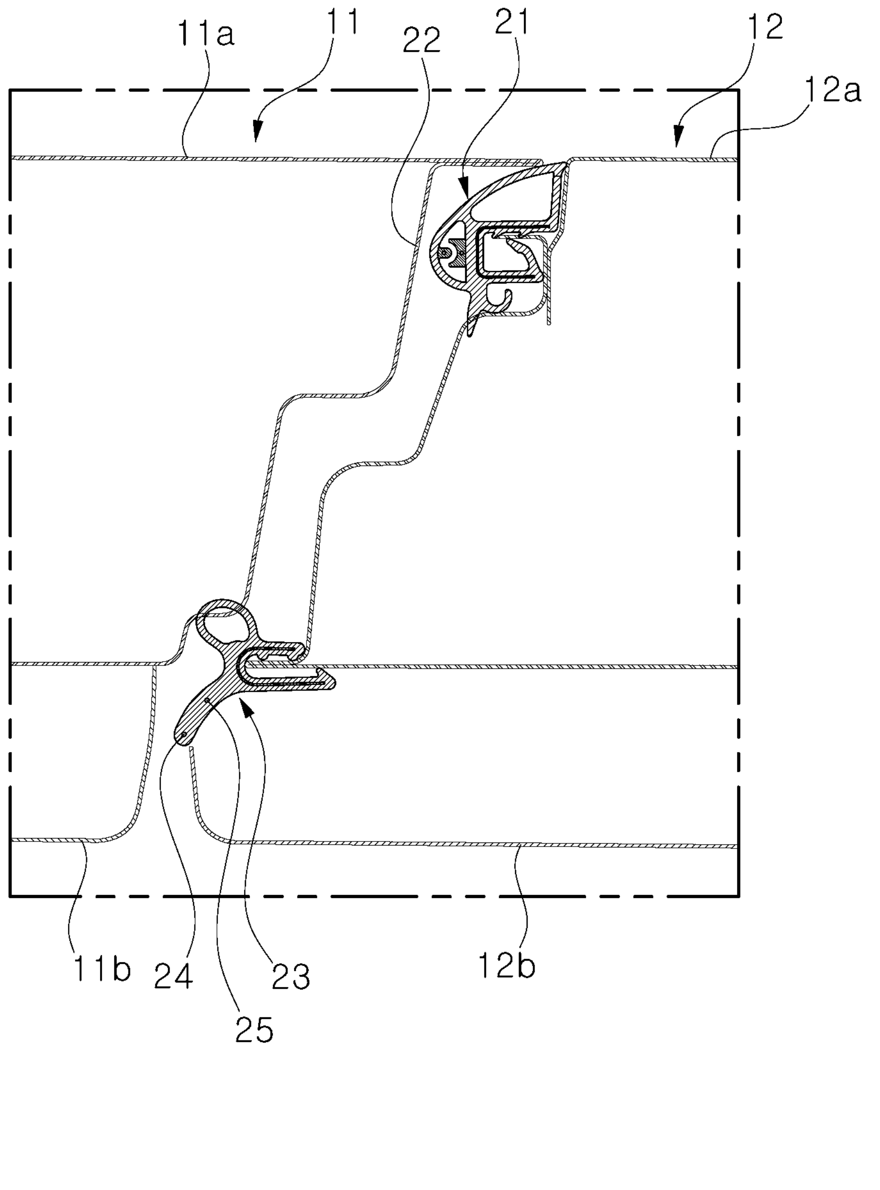
FIG. 2 is a cross-sectional diagram taken along line II-II of FIG. 1.

FIG. 2 is a cross-sectional diagram taken along line I-I of FIG. 1. An external pinch sensor 22 and an internal pinch sensor 25 for detecting a pinch between the front door 11 and the rear door 12 may be provided on an external weather strip 21 and an internal weather strip 23, respectively.

The front door 11 and the rear door 12 may include door panels 11*a* and 12*a* as base door frames mounted on door trims 11*b* and 12*b* as finishing materials on the internal side of the vehicle 1.

The external weather strip 21 and the internal weather strip 23 may be provided on any one of the front door 11 or the rear door 12 to provide a sealing between the front door 11 and the rear door 12 when both the front door 11 and the rear door 12 are closed.

Figure 3:
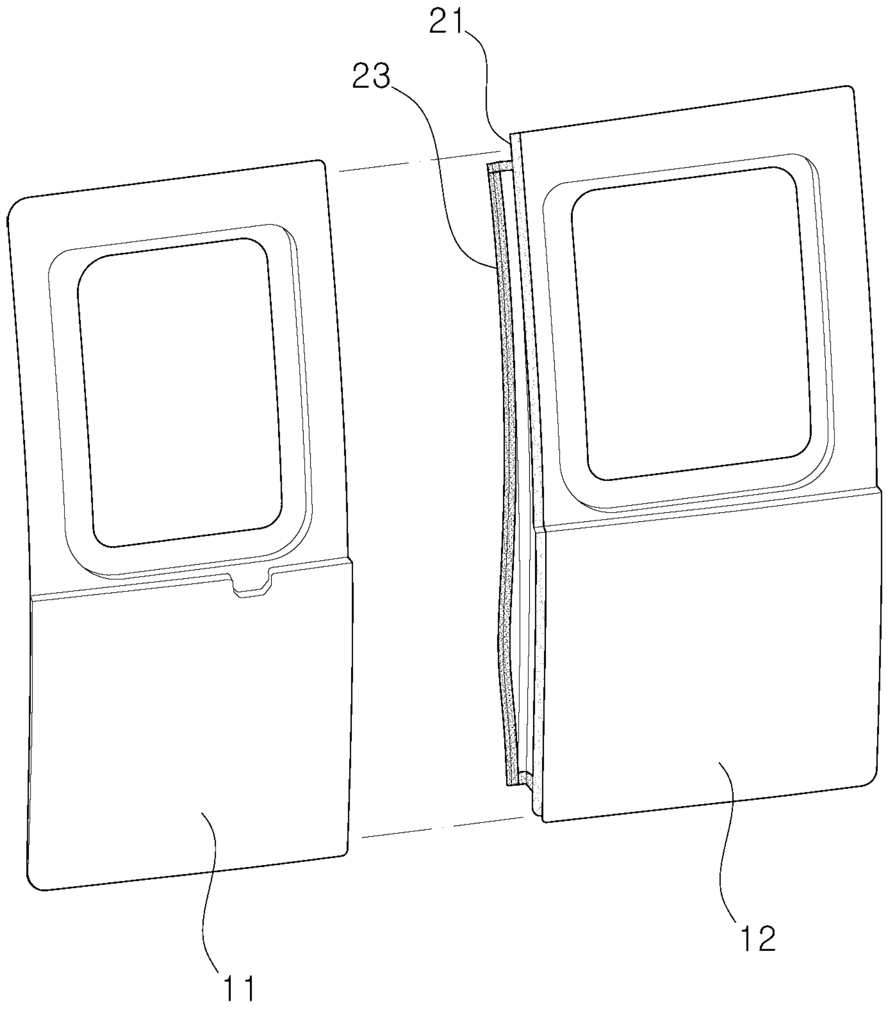
FIG. 3 is a perspective diagram seen from an outside of the vehicle in which an external weather strip and an internal weather strip are provided at the rear door with an external sensor and an internal sensor of the vehicle door pinch detection system according to an exemplary embodiment of the present disclosure.
Figure 4:
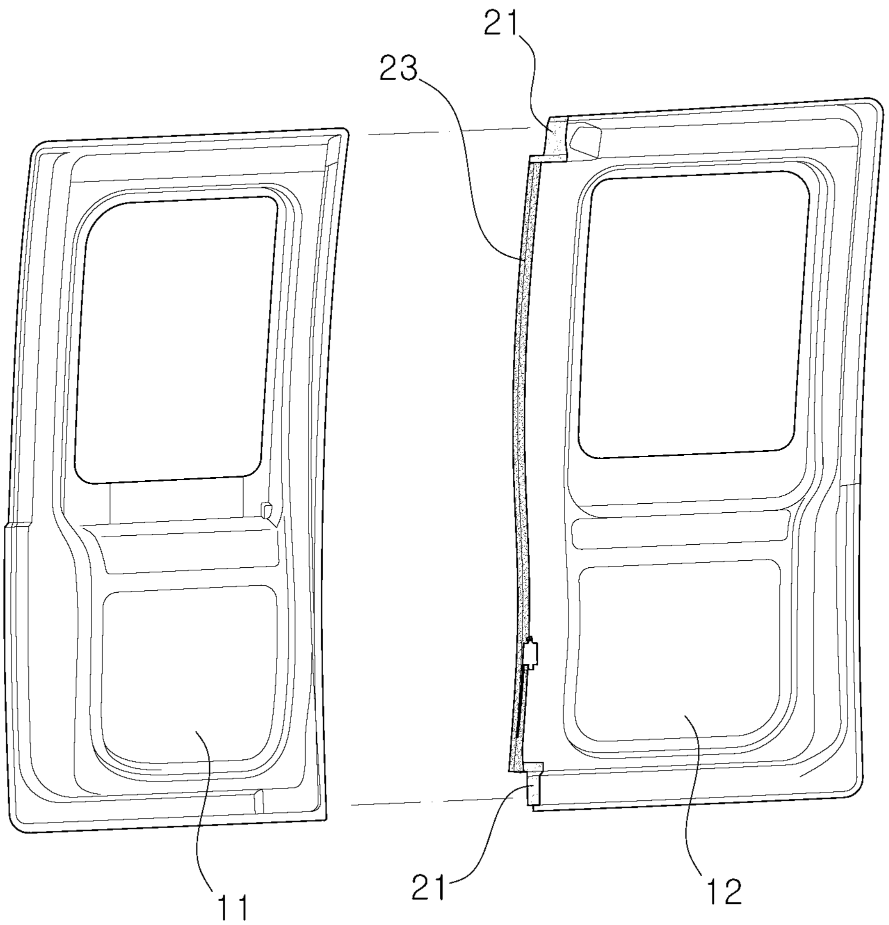
FIG. 4 is a perspective diagram seen from the interior of the vehicle in which an external weather strip and an internal weather strip are provided at the rear door with an external sensor and an internal sensor of the vehicle door pinch detection system according to an exemplary embodiment of the present disclosure.
Figure 5:
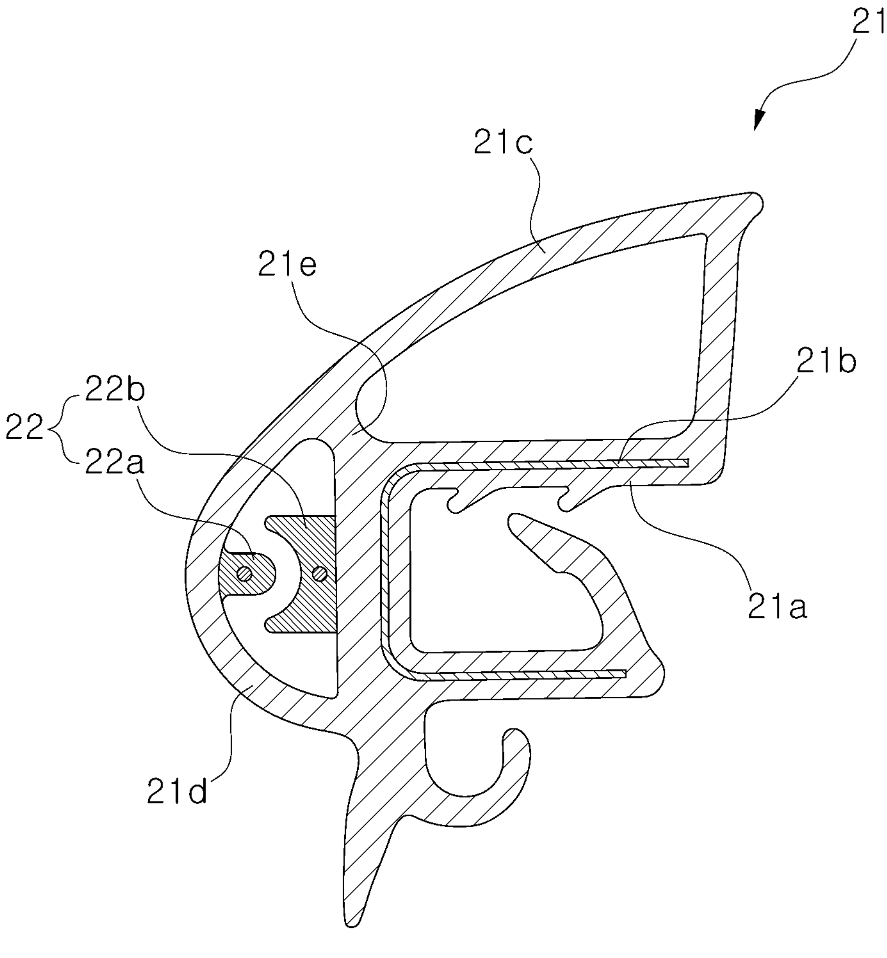
FIG. 5 is a cross-sectional diagram illustrating a state in which the external sensor of the vehicle door pinch detection system according to an exemplary embodiment of the present disclosure is provided on the external weather strip.
Figure 6:
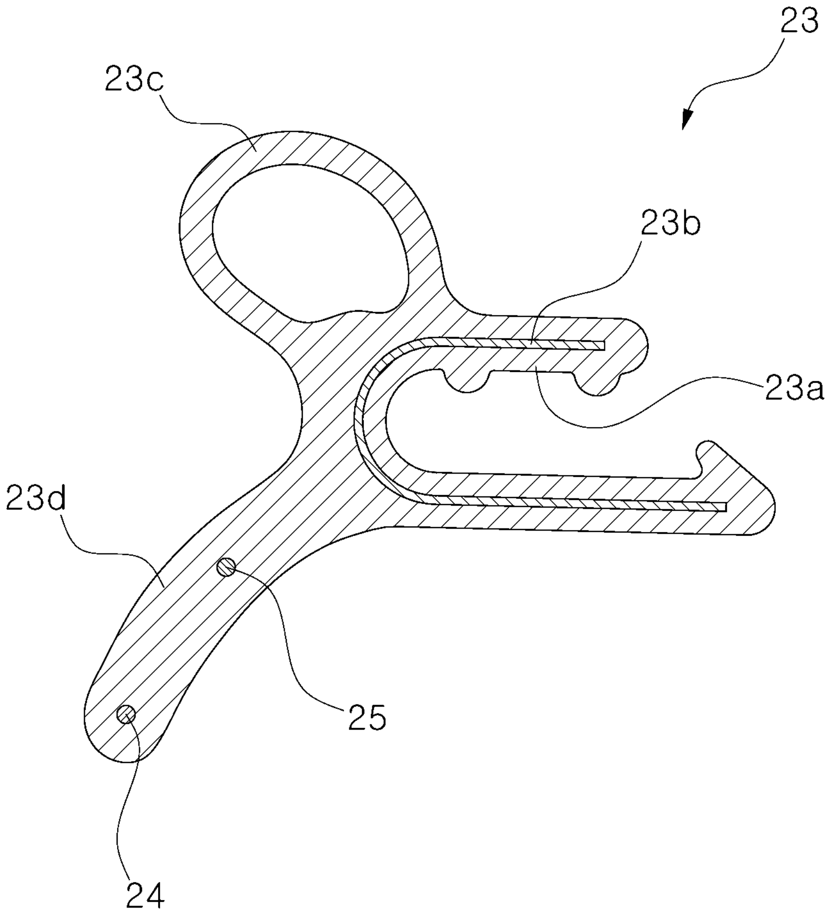
FIG. 6 is a cross-sectional diagram illustrating a state in which the internal sensor of the vehicle door pinch detection system according to an exemplary embodiment of the present disclosure is provided on the internal weather strip.
Figure 7:
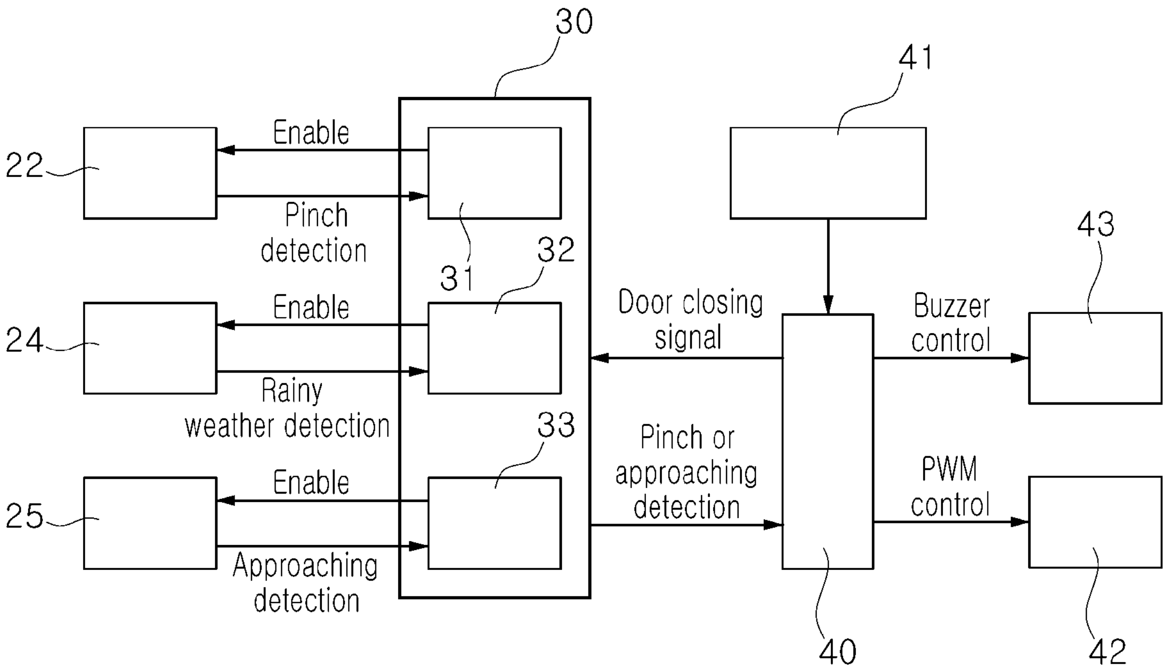
FIG. 7 is a block diagram illustrating the vehicle door pinch detection system according to an exemplary embodiment of the present disclosure.

For example, as illustrated in FIG. 3 and FIG. 4, the external weather strip 21 and the internal weather strip 23 may be provided on the front end portion of the rear door 12 so that the external weather strip 21 is fitted on the external side of the front end portion of the rear door 12 and the internal weather strip 23 is fitted on the internal side of the front end portion of the rear door 12. Thus, the external weather strip 21 and the internal weather strip 23 may seal the external and internal sides, respectively, of the vehicle 1 between the rear end portion of the front door 11 and the front end portion of the rear door 12.

The external pinch sensor 22 may be integrally formed on the external weather strip 21.

The external weather strip 21 may include a first fixing portion 21*a* fixedly fitted to one side of the door 11 or 12, a first insert 21*b* inserted into an interior of the first fixing portion 21*a*, a first hollow sealing portion 21*c* formed on an external side of the first fixing portion 21*a* to abut against the body or the other door 12 or 11 of the vehicle 1, a first hollow sensor portion 21*d* formed to be connected to the first sealing portion 21*c* from the external side of the first fixing portion 21*a*, and a bridge portion 21*e* formed between the first sealing portion 21*c* and the first sensor portion 21*d* to separate the first sealing portion 21*c* and the first sensor portion 21*d*.

The external pinch sensor 22 may be provided on the internal side of the first sensor portion 21*d*. The external pinch sensor 22 may be a contact-type sensor which is configured to detect a pinch by a variable resistance occurring when two spaced apart members 22*a* and 22*b* are brought into contact.

The first member 22*a* and the second member 22*b* forming the external pinch sensor 22 may be provided spaced apart from each other on the internal surface of the first sensor portion 21*d*. The first member 22*a* and the second member 22*b* may be formed of a conductive rubber material, and when the first and second members come into contact with each other due to pinching, the pinch may be detected through a difference in voltage generated by a change in resistance in a circuit connected to the external pinch sensor 22. The circuit for detecting pinching through the external pinch sensor 22 may include two resistors connected in parallel, wherein one of the resistors is connected in series with the external pinch sensor 22. In the instant case, current normally may flow only through one resistor, but when a pinch occurs, current flows through both resistors, causing the resistance of the entire circuit to change, resulting in a voltage difference, which indicates the occurrence of the pinch.

The internal pinch sensor 25 may be integrally formed on the internal weather strip 23.

The internal weather strip 23 may include a second fixing portion 23*a* fixedly fitted to the door 11 or 12, a second insert 23*b* inserted into an interior of the second fixing portion 23*a*, a second hollow sealing portion 23*c* formed on an external side of the second fixing portion 23*a* to abut against the body or the other door 12 or 11 of the vehicle 1, a second sensor portion 23*d* formed to protrude from the second fixing portion 23*a* at a distance from the second sealing portion 23*c*.

The internal pinch sensor 25 may be formed on the second sensor portion 23*d*.

Furthermore, a rain detection sensor 24 may also be formed on the second sensor portion 23*d*.

Looking at the arrangement of the internal pinch sensor 25 and the rain detection sensor 24 from the internal weather strip 23, the rain detection sensor 24 may be disposed on the internal side of the vehicle than the internal pinch sensor 25.

The internal pinch sensor 25 and the rain detection sensor 24 may be provided as an impedance-detective sensor or the like that detects the user's touch on a flat screen or the like.

Accordingly, when the occupant's body is approaching the internal pinch sensor 25 or is pinched around a portion where the internal pinch sensor 25 is provided, the impedance value may change so that the pinch is detected.

On the other hand, if the rain droplets are approaching the rain detection sensor 24 due to rainy weather, the impedance value may also change, so that the controller 30 may determine whether it is rainy weather or non-rainy weather.

In an exemplary embodiment of the present disclosure, the controller 30 may determine whether a current weather is rainy weather or non-rainy weather.

When the impedance type sensor is applied as the internal pinch sensor 25 or the rain detection sensor 24, the impedance type sensor may have a high frequency band so that the output value varies depending on an object in contact with the sensor, allowing the pinch of the occupant's body or the rainy weather to be detected discriminately.

The controller 30 may monitor the statuses of the external pinch sensor 22, the internal pinch sensor 25, and the rain detection sensor 24, and determine the pinch or approaching of the occupant's body through the external pinch sensor 22 and the internal pinch sensor 25, as well as whether it is rainy weather or non-rainy weather through the rain detection sensor 24. In other words, the controller 30 may include an external pinch controller 31, an internal pinch controller 33, and a rain detection controller 32 that receive output values from and control the external pinch sensor 22, the internal pinch sensor 25, and the rain detection sensor 24 through communication therewith.

Figure 8:
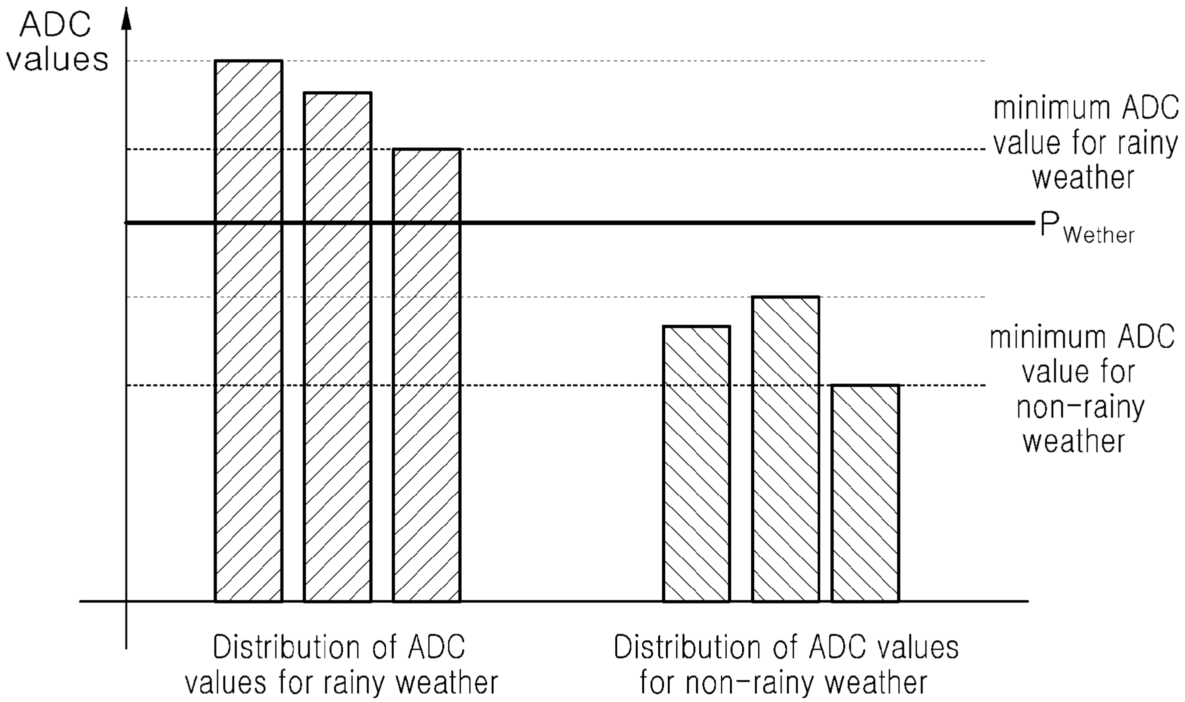
FIG. 8 is a graph illustrating a distribution of measured values in selecting parameters for determining whether it is rainy weather or non-rainy weather in the vehicle door pinch detection system according to an exemplary embodiment of the present disclosure.

In the controller 30, a rainy weather determination threshold $P_{weather}$ for determining the rainy weather may be stored in advance. As illustrated in FIG. 8, the rainy weather determination threshold $P_{weather}$ may be set by use of the ADC value obtained through an analog digital converter by converting a voltage value or current value measured by the rain detection sensor 24 in the actual rainy weather situation and the non-rainy weather situation. For example, the arithmetic mean of the minimum ADC value in rainy weather and the maximum ADC value in non-rainy weather may be set as the rainy weather determination threshold $P_{weather}$.

Accordingly, the controller 30 may be configured to determine that when the output value of the rain detection sensor 24 is higher than the rainy weather determination threshold $P_{weather}$, the weather is the rainy weather, and when the output value of the rain detection sensor 24 is lower than the rainy weather determination threshold $P_{weather}$, the weather is the non-rainy weather.

Figure 9:
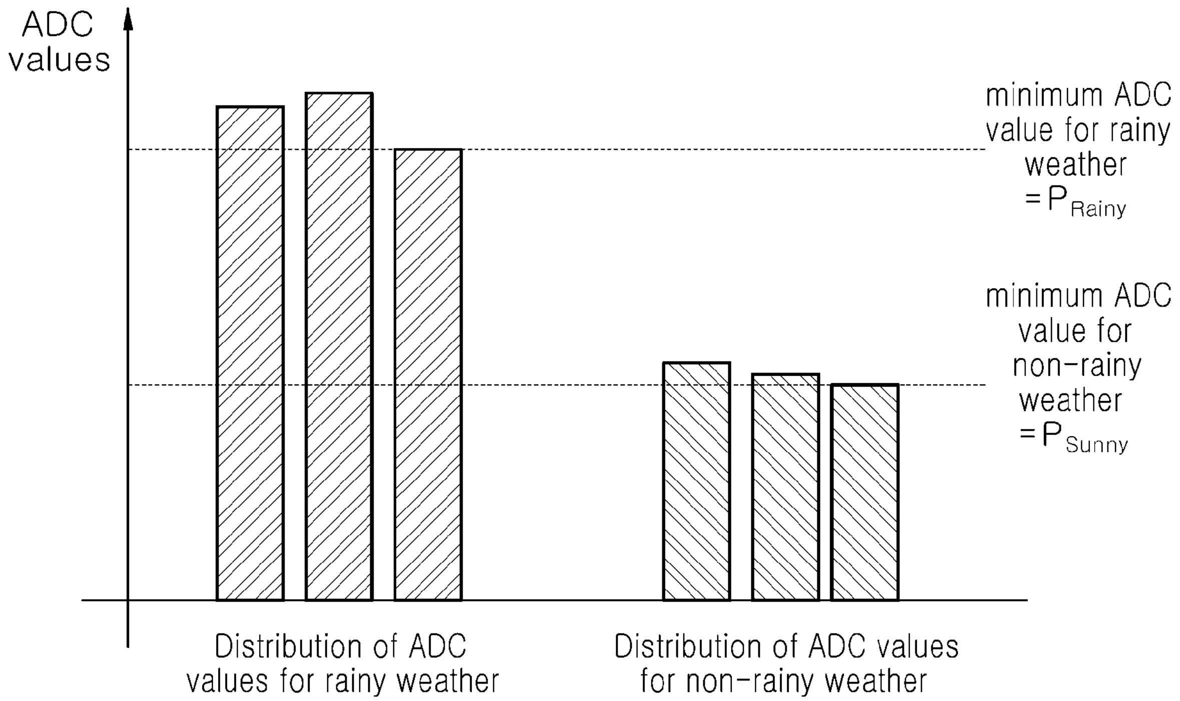
FIG. 9 is a graph illustrating a distribution of measured values in selecting parameters for determining whether a vehicle door is pinched in rainy weather and non-rainy weather in the vehicle door pinch detection system according to an exemplary embodiment of the present disclosure.

On the other hand, FIG. 9 shows an example of setting a pinch determination threshold for determining whether there is a pinch in the rainy weather or the non-rainy weather.

The rainy weather pinch threshold $P_{Rainy}$ may be set to the minimum value of the ADC values converted from the values measured by the internal pinch sensor 25 in rainy weather.

The non-rainy weather pinch threshold $P_{Sunny}$ may also be set to the minimum value of the ADC values converted from the values measured by the internal pinch sensor 25 in non-rainy weather.

Therefore, the controller 30 may be configured to determine whether it is rainy weather or non-rainy weather depending on the rainy weather determination threshold $P_{weather}$, and if it is rainy, determine that there is the body's pinch or approaching at a position where the internal pinch sensor 25 is provided with the rainy weather pinch threshold $P_{Rainy}$. Furthermore, in the case of non-rainy weather, the controller 30 may be configured to determine that there is the body's pinch or approaching at a position where the internal pinch sensor 25 is provided with the non-rainy weather pinch threshold $P_{Sunny}$.

The controller 30 may be connected to a door controller 40 that is configured to control the opening and closing of the doors 11 and 12.

The controller 30 may output to the door controller 40 an indication that the body's pinch or approaching has occurred around the periphery of the door 11 or 12, and the door controller 40 may control the door 11 or 12 accordingly. The door controller 40 may also output to the controller 30 a closing signal of the door 11 or 12 to detect the body's pinch or approaching.

The door controller 40 may be connected to a door button 41 that outputs an operation signal when the opening of the door 11 or 12 is required, and an alarm means 43, such as a buzzer, a display, a lamp, or the like, that alarms the situation when the opening or closing of the door 11 or 12 is completed. Furthermore, the door controller 40 may be configured for controlling a door motor 42 which operates the opening and closing of the door 11 or 12. For example, the door motor 42 may be controlled by the door controller 40 in a pulse width modulation (PWM) manner.

In the controller 30, a vehicle door pinch detection method to be described later may be stored in a logic, which, together with the door controller 40, may be performed by the controller to detect a pinch around the periphery of the door 11 or 12.

Figure 10:
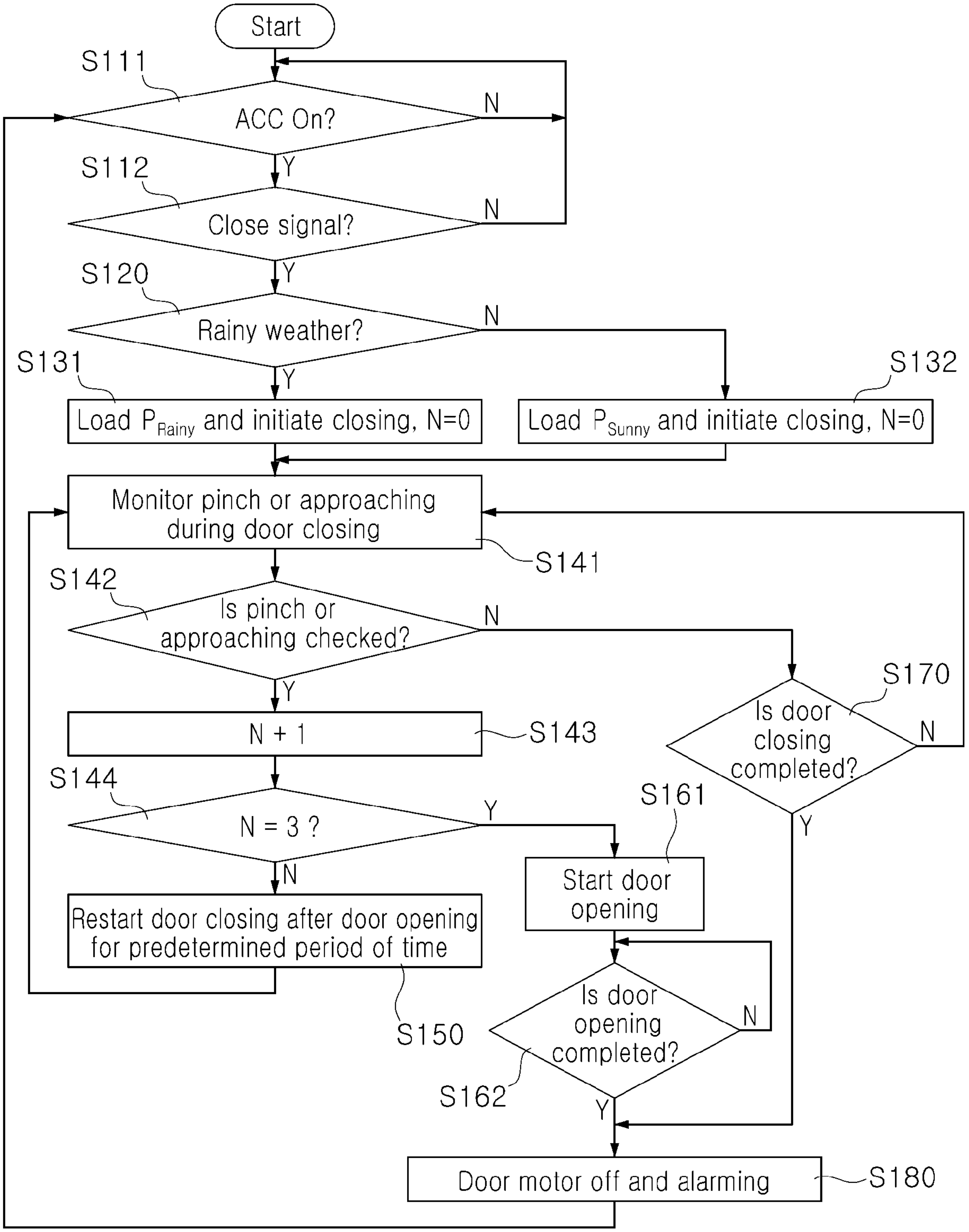
FIG. 10 is a flowchart illustrating a vehicle door pinch detection method with improved detection performance according to an exemplary embodiment of the present disclosure.

FIG. 10 illustrates a vehicle door pinch detection method with improved detection performance according to an exemplary embodiment of the present disclosure.

The vehicle door pinch detection method with improved detection performance according to an exemplary embodiment of the present disclosure may include: a door closure request step S112 in which the controller 30 determines whether there is a request to close the door 11 or 12; a rainy weather determination step S120 in which the controller 30 determines whether it is rainy weather or non-rainy weather by the rain detection sensor 24 provided on the weather strip 21 or 23; and a closure initiation step S131 or S132 in which the controller 30 loads a pinch threshold $P_{Rainy}$ or $P_{Sunny}$ and starts actuating the door motor 42 for closing the door 11 or 12; and a pinch determination step S142 in which the controller 30 determines whether there is a pinch by the pinch sensors 22 and 25 provided on the weather strips 21 and 23, wherein the controller 30 loads different pinch thresholds $P_{Rainy}$ and $P_{Sunny}$ depending on whether it is rainy weather or non-rainy weather, and if the pinch is detected in the pinch determination step S142, the controller 30 opens the door 11 or 12.

The power supply determination step S111 may determine whether the vehicle 1 is supplied with power by a driving or starting device. The controller 30 may be configured to determine whether power is being applied to various devices necessary for performing the vehicle door pinch detection method according to an exemplary embodiment of the present disclosure. For example, when the vehicle 1 becomes Accessory (ACC) ON before KEY ON for driving so that power is applied to the external pinch sensor 22, the internal pinch sensor 25, the rain detection sensor 24, and the like, the sensors may transmit the power application status to the controller 30. When power is applied to respective components for carrying out the present disclosure, the controller 30 may proceed to the next step.

In the door closure request step S112, the controller 30 may be configured to determine whether there is an occupant's request to close the doors 11 or 12. When the door button 41 provided on the interior of the vehicle 1 is manipulated by the occupant so that the manipulation signal is input to the controller 30, the controller 30 may be configured to determine that there is a request for closing the door 11 or 12 of the vehicle 1 and proceed to the next step. On the other hand, the request for closing the door 11 or 12 may be transmitted to the controller 30 not only via the door button 41 but also via an external terminal. For example, an external administrator may control the vehicle 1 via a terminal such as a smartphone. In the instant case, when the vehicle 1 is stopped at a station or the like, the opening and closing of the door 11 or 12 may be controlled through the terminal, which may mean that there is a request to close the door 11 or 12.

If either the power supply determination step S111 or the door closure request step S112 is not satisfied, the controller 30 may return to the power supply determination step S111 to cause the logic to be performed again from the beginning of the flowchart.

In the rainy weather determination step S120, the controller 30 may be configured to determine whether it is rainy weather or non-rainy weather by the rain detection sensor 24 provided on the internal weather strip 23. The internal weather strip 23 may be provided with the rain detection sensor 24, which is normally energized with a high frequency current to detect the rain droplets or the body's approaching by a change in impedance. The controller 30 may be configured to determine whether it is rainy weather or non-rainy weather by the signal input from the rain detection sensor 24.

In the closure initiation steps S131 and S132, the controller 30 may load the pinch threshold $P_{Rainy}$ or $P_{Sunny}$ depending on whether it is rainy weather or non-rainy weather and start actuating the door motor 42 for closing the door 11 or 12. The controller 30 may load the pre-stored pinch threshold $P_{Rainy}$ or $P_{Sunny}$ and start actuating the door motor 42 for closing the door 11 or 12.

If it is rainy weather, the controller 30 may load the rainy weather pinch threshold $P_{Rainy}$ and perform the rainy weather closure initiation step S131 to actuate the door motor 42.

On the other hand, if it is a non-rainy weather, the controller 30 may load the non-rainy weather pinch threshold $P_{Sunny}$ and performs the non-rainy weather closure initiation step S132 to actuate the door motor 42.

Here, the rainy weather pinch threshold $P_{Rainy}$ may be set higher than the non-rainy weather pinch threshold $P_{Sunny}$.

When the rainy weather closure initiation step S131 or the non-rainy weather closure initiation step S132 is performed, a count N, which is the number of times the body's pinch or approaching is detected at the door 11 or 12, may be reset. That is, when the rainy weather closure initiation step S131 or the non-rainy weather closure initiation step S132 is performed, the count N may become 0 (zero).

After the rainy weather closure initiation step S131 or the non-rainy weather closure initiation step S132, the controller 30 may perform a pinch monitoring step $141 to monitor whether the body's pinch or approaching occurs with the signal from the external pinch sensor 22 or the internal pinch sensor 25.

In the pinch determination step S142, the controller 30 may be configured to determine whether there is a pinch with the signal from the pinch sensors 22 and 25 mounted on the weather strips 21 and 23.

If the controller 30 detects the body's pinch or approaching via the external pinch sensor 22 or the internal pinch sensor 25, the controller 30 may perform a temporary opening step S150 to open the door 11 or 12, and after a predetermined time period, close the door 11 or 12 again. Since the pinch or approaching has been detected at the door 11 or 12, to prevent injury or an accident, the controller 30 may open the door 11 or 12, which was being closed, and after a predetermined time period, starts closing the door 11 or 12 again. by temporarily opening the door 11 or 12 for the predetermined time period via the temporary opening step S150, the occupant may move away his body or belongings from the door 11 or 12.

After the temporary opening step S150, the controller 30 may return to the pinch monitoring step S141.

On the other hand, if the body's pinch or approaching is continuously repeated at the door 11 or 12, which may indicate that there is another problem, a count increasing step S143 and an increased count determination step S144 may be performed between the pinch determination step S142 and the temporary opening step S150.

That is, the count increasing step S143 increases the count N each time the controller 30 may detect the body's pinch or approaching in the pinch determination step S142.

The increased count N in the count increasing step S143 may be compared by the controller 30 with a count threshold in the increased count determination step S144. That is, in the increased count determination step S144, the controller 30 may be configured to determine whether the increased count N has reached a predetermined count threshold at which the controller 30 stops the control operation. Normally, if the body's pinch or approaching occurs temporarily upon closing of the door 11 or 12, the body's pinch or approaching may be resolved in the temporary opening step S150. However, if the body's pinch or approaching continues to occur so that the count N reaches the count threshold N, then there may be a problem with the entire system, so a further pinch monitoring operation is not required.

Therefore, when the count N reaches the count threshold, the controller 30 may perform a door opening step S161 to open the door 11 or 12 to interrupt the control.

In the door opening step S161, the controller 30 may actuate the door motor 42 to open the door 11 or 12.

Accordingly, the controller 30 may perform an opening completion determination step S162 to determine whether the opening of the door 11 or 12 is completed, until the opening of the door 11 or 12 is completed.

In a motor stopping step S180, when the opening of the door 11 or 12 is completed, the controller 30 may stop actuating the door motor 42, and alarms the stopping of the door motor 42. Since there is no need for the door motor 42 to operate when the opening of the doors 11 or 12 is completed, the operation of the door motor 42 may be stopped. Furthermore, the stopping of the door motor 42 may be alarmed by a buzzer 43, a display or a lamp or the like provided on the vehicle 1 through sound, text, lighting manner, or the like. On the other hand, if the motor stopping step S180 is performed after the opening completion determination step S162, the case may indicate that the door 11 or 12 is abnormally opened, which needs to be alarmed for the occupant or the manager to recognize the situation.

On the other hand, if it is determined that no pinch has been detected in the pinch determination step S142, the controller 30 may is configured to perform a closing completion determination step S170 to determines whether the closing of the door 11 or 12 is completed.

If the closing of the door 11 or 12 is completed in the closing completion determination step S170, the controller 30 may stop the actuation of the door motor 42, and performs a motor stopping step S180 to alarm the stopping of the door motor 42.

Here, when the motor stopping step S180 is performed after the closing completion determination step S170, the door 11 or 12 may be normally opened, so that the case is alarmed differently than when the motor stopping step S180 is performed after the opening completion determination step S162.

For example, in the case of alarming with sound, alarming may be performed with a different sound, or in the case of alarming with text or lamp, alarming may be performed with a different text or lighting manner.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), Silicon Disk Drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person having ordinary knowledge in the art.

Furthermore, the terms such as “unit”, “module”, etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle door pinch detection system, the system comprising:

- an internal pinch sensor configured for detecting a pinch at a periphery of a vehicle door provided on one side of a vehicle during a closing operation of the vehicle door;
- a rain detection sensor provided separately from the internal pinch sensor and configured for detecting rainy weather; and
- a controller operatively connected to the internal pinch sensor and the rain detection sensor and configured to determine whether current weather is rainy weather or non-rainy weather based on an output of the rain detection sensor, to load different pinch thresholds from a storage device in response to the output of the rain detection sensor, and to determine an occurrence of the pinch when an output of the internal pinch sensor is equal to or greater than the loaded pinch thresholds.

2. The vehicle door pinch detection system of claim 1, wherein the loaded pinch threshold for the non-rainy weather is higher than the loaded pinch threshold for the rainy weather.

3. The vehicle door pinch detection system of claim 1, wherein the internal pinch sensor and the rain detection sensor transmit respective output values depending on a change in impedance of the internal pinch sensor and the rain detection sensor, repspectively and the controller is further configured to compare the output values of the internal pinch sensor and the rain detection sensor with preset values to determine the occurrence of the pinch or approaching of a body to the internal pinch sensor, or the rainy weather, respectively.

4. The vehicle door pinch detection system of claim 1, wherein the internal pinch sensor and the rain detection sensor are mounted on an internal weather strip of the vehicle.

5. The vehicle door pinch detection system of claim 1, further including an external pinch sensor operatively connected to the controller and provided on an external weather strip to detect a pinch depending on a change in a resistance value of the external pinch sensor.

6. The vehicle door pinch detection system of claim 5, wherein the controller includes:

- a rain detection controller configured to receive an output from the rain detection sensor and control the rain detection sensor;
- an internal pinch controller configured to receive an output from the internal pinch sensor and control the internal pinch sensor; and
- an external pinch controller configured to receive an output from the external pinch sensor and control the external pinch sensor.

7. The vehicle door pinch detection system of claim 1, wherein the controller is connected to a door controller to control an opening or a closing of the vehicle door.

8. The vehicle door pinch detection system of claim 7, wherein the door controller is connected to a door button that outputs an operation signal when the opening of the vehicle door is requested, and to an alarm that alerts when the opening or the closing of the vehicle door is completed.

9. The vehicle door pinch detection system of claim 7, wherein the controller is further configured to, upon detection of the pinch or approaching of a body around the periphery of the vehicle door during the closing of the vehicle door, increase a count, and when the increased count is below a predetermined count threshold, request the door controller to open the vehicle door for a predetermined time period and then close the vehicle door again.

10. A method of detecting a pinch of an occupant of a vehicle made by a door of the vehicle, the method comprising the steps of:

- determining, by a controller, whether there is a vehicle door closing request;
- determining, by the controller, whether current weather is rainy weather or non-rainy weather by a rain detection sensor provided on a weather strip and operatively connected to the controller;
- initiating, by the controller, closing of the vehicle door by loading different pinch thresholds from a storage device, depending on whether the current weather is the rainy weather or the non-rainy weather and activating a door motor operatively connected to the controller to close the vehicle door; and
- determining, by the controller, whether the pinch of the occupant of the vehicle occurs by a pinch sensor provided on the weather strip and operatively connected to the controller,
- wherein when the pinch has been detected, the controller is further configured to activate the door motor to open the vehicle door.

11. The method of claim 10, wherein the different pinch thresholds include a rainy weather pinch threshold, and the controller is further configured to load the rainy weather pinch threshold when the controller has determined that the current weather is the rainy weather.

12. The method of claim 10, wherein the different pinch thresholds include a non-rainy weather pinch threshold, and the controller is further configured to load the non-rainy weather pinch threshold when the controller has determined that the current weather is the non-rainy weather.

13. The method of claim 10, wherein the different pinch thresholds include a rainy weather pinch threshold and a non-rainy weather pinch threshold, wherein the rainy weather pinch threshold is higher than the non-rainy weather pinch threshold.

14. The method of claim 10,

- wherein the controller is further configured to reset a count when the closing of the vehicle door is initiated, and
- wherein the controller
  - increases the count when the pinch is detected;
  - when the count has reached a predetermined count threshold, the controller stops detecting the pinch; and
  - when the count is below the predetermined count threshold, the controller activates the door motor to open the vehicle door and then close the vehicle door again after a predetermined time period.

15. The method of claim 14, wherein:

- when the count has reached the predetermined count threshold, the controller activates the door motor to open the vehicle door;

the controller further determines whether the opening of the vehicle door has been completed; and in response to concluding that the opening of the vehicle door has been completed, the controller stops the activation of the door motor and alerts that the activation of the door motor has been stopped.

16. The method of claim 10, wherein the weather strip is an internal weather strip of the vehicle.

17. The method of claim 10, wherein the weather strip comprises an internal weather strip and an external weather strip and wherein the pinch sensor includes:

an internal pinch sensor provided on the internal weather strip to detect the pinch or approaching of the occupant to the internal pinch sensor by a change in impedance of the internal pinch sensor; and an external pinch sensor provided on the external weather strip to detect the pinch by a change in a resistance value of the external pinch sensor.

18. The method of claim 16, wherein when the pinch is not detected, the controller determines whether the closing of the vehicle door has been completed, and when the closing of the vehicle door has been completed, the controller is further configured to stop the activation of the door motor and alert that the activation of the door motor has been stopped.

* * * * *